United States Patent
Kobayashi

(10) Patent No.: US 8,982,232 B2
(45) Date of Patent: Mar. 17, 2015

(54) IMAGE PROCESSING APPARATUS AND IMAGE PROCESSING METHOD

(75) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 13/543,528

(22) Filed: Jul. 6, 2012

(65) Prior Publication Data

US 2013/0016253 A1    Jan. 17, 2013

(30) Foreign Application Priority Data

Jul. 11, 2011 (JP) ................................. 2011-152959

(51) Int. Cl.
 *H04N 5/235*  (2006.01)
 *H04N 5/238*  (2006.01)
 *H04N 5/272*  (2006.01)
 *H04N 5/357*  (2011.01)
 *H04N 5/365*  (2011.01)

(52) U.S. Cl.
 CPC ............... *H04N 5/272* (2013.01); *H04N 5/357* (2013.01); *H04N 5/3656* (2013.01)
 USPC ........................................ 348/222.1; 348/364

(58) Field of Classification Search
 CPC .................... H04N 5/2356; H04N 5/35536
 See application file for complete search history.

(56) References Cited

U.S. PATENT DOCUMENTS

| | | | | |
|---|---|---|---|---|
| 2007/0229698 A1* | 10/2007 | Kakinuma et al. | ............ | 348/362 |
| 2009/0232416 A1* | 9/2009 | Murashita et al. | ............ | 382/294 |
| 2010/0091119 A1* | 4/2010 | Lee | ............ | 348/208.4 |
| 2011/0254976 A1* | 10/2011 | Garten | ............ | 348/229.1 |
| 2012/0002898 A1* | 1/2012 | Cote et al. | ............ | 382/278 |

FOREIGN PATENT DOCUMENTS

| | | | |
|---|---|---|---|
| CN | 101079998 A | 11/2007 | |
| JP | 2002-190983 A | 7/2002 | |

OTHER PUBLICATIONS

First Office Action, State Intellectual Property Office of the People's Republic of China, Dec. 26, 2014.

* cited by examiner

*Primary Examiner* — Jason Flohre
(74) *Attorney, Agent, or Firm* — Canon U.S.A. Inc., IP Division

(57) ABSTRACT

An image processing apparatus that, when combining a plurality of images, improves image quality by reducing noise in a region in which movement is detected, wherein a noise in the moving region is reduced by replacing the region in which movement is detected, with a low-noise image.

17 Claims, 9 Drawing Sheets

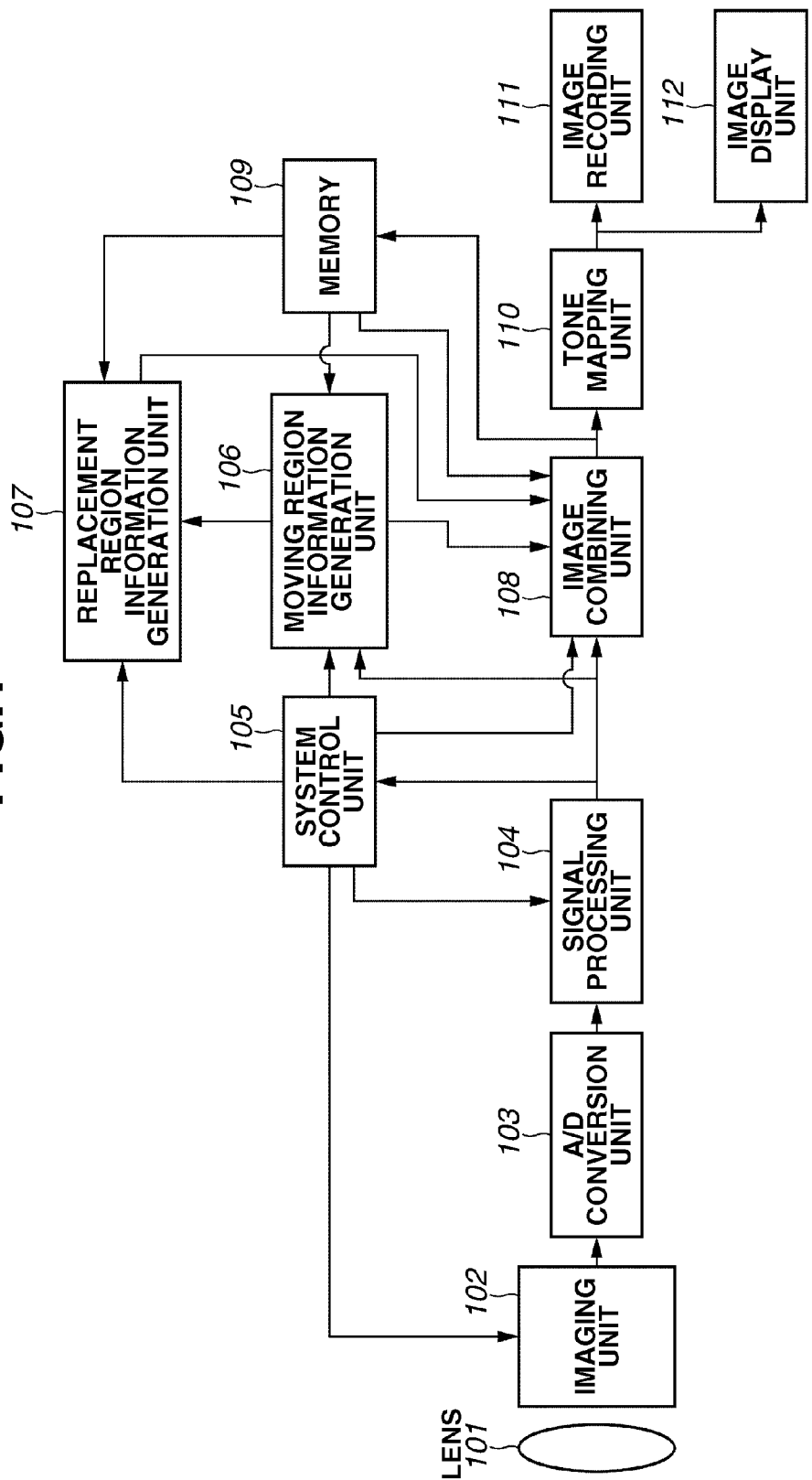

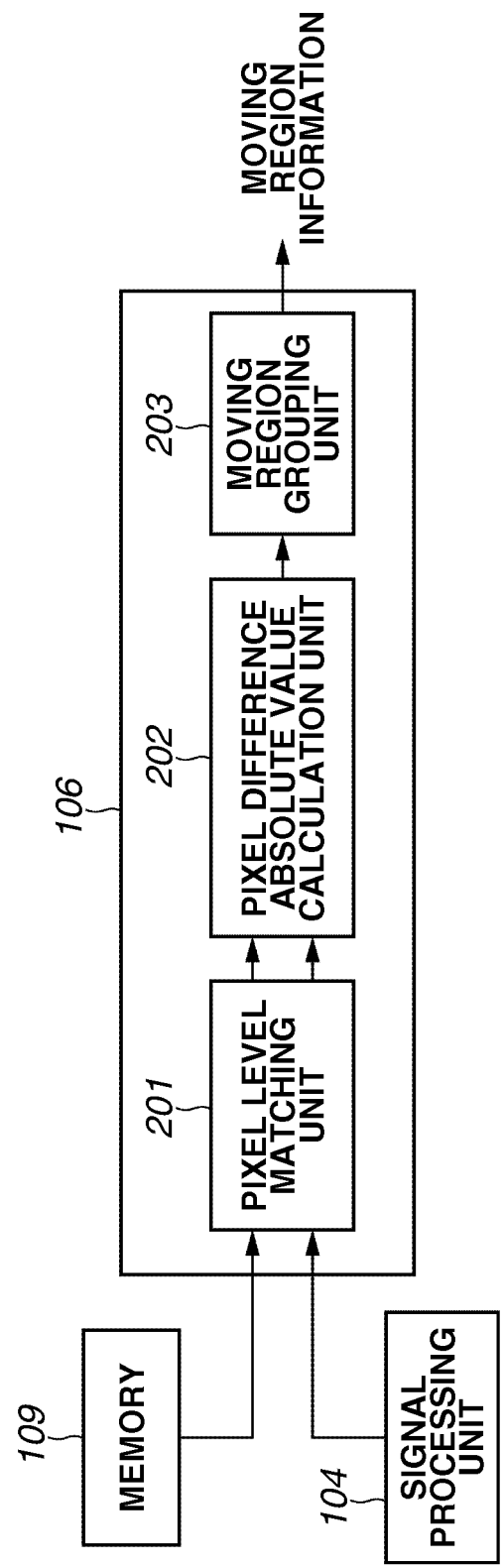

UNDEREXPOSED IMAGE

OVEREXPOSED IMAGE

MOVING REGION INFORMATION

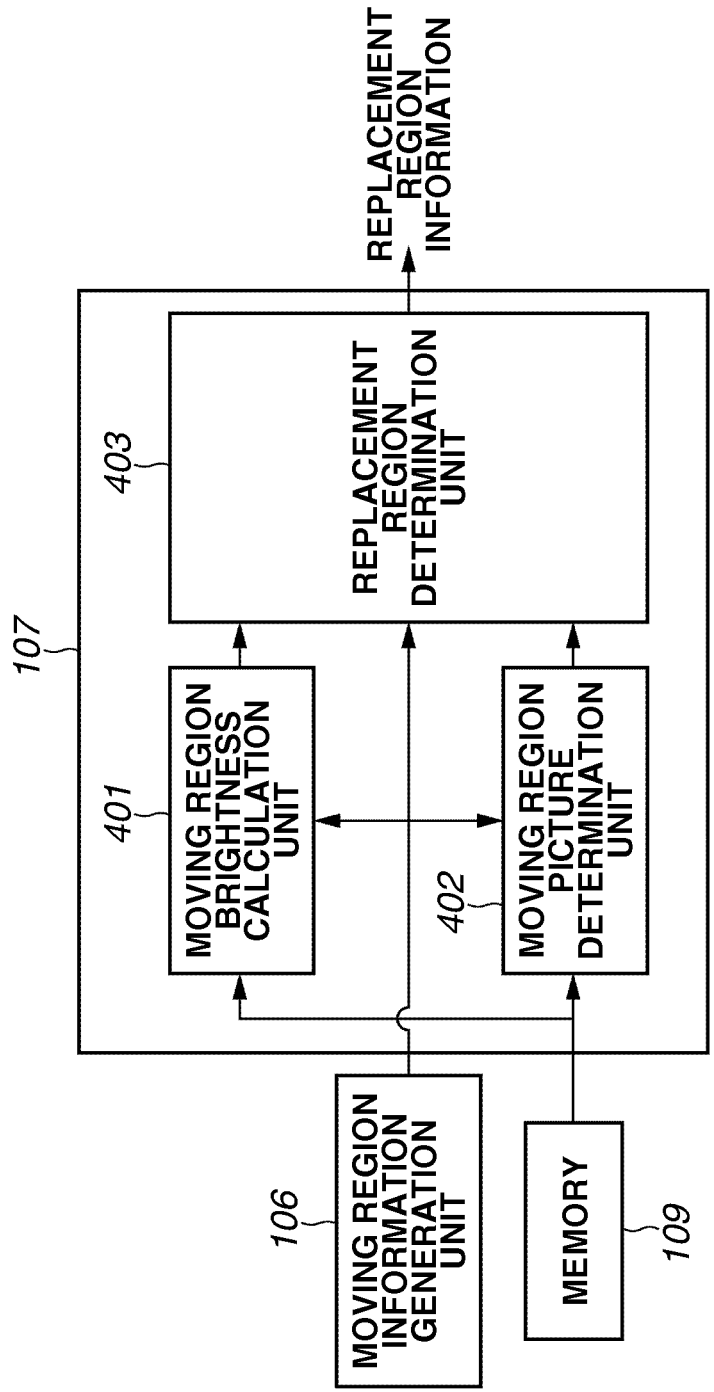

UNDEREXPOSED IMAGE

OVEREXPOSED IMAGE

COMBINATION STANDARD IMAGE

MOVING REGION INFORMATION
DIFFERENCE ABSOLUTE VALUE LARGE a301
DIFFERENCE ABSOLUTE VALUE LARGE a302

REPLACEMENT DETERMINATION REGION
a701  a702
a704
a703
DIFFERENCE ABSOLUTE VALUE SMALL

REPLACEMENT REGION INFORMATION
a705 REPLACEMENT

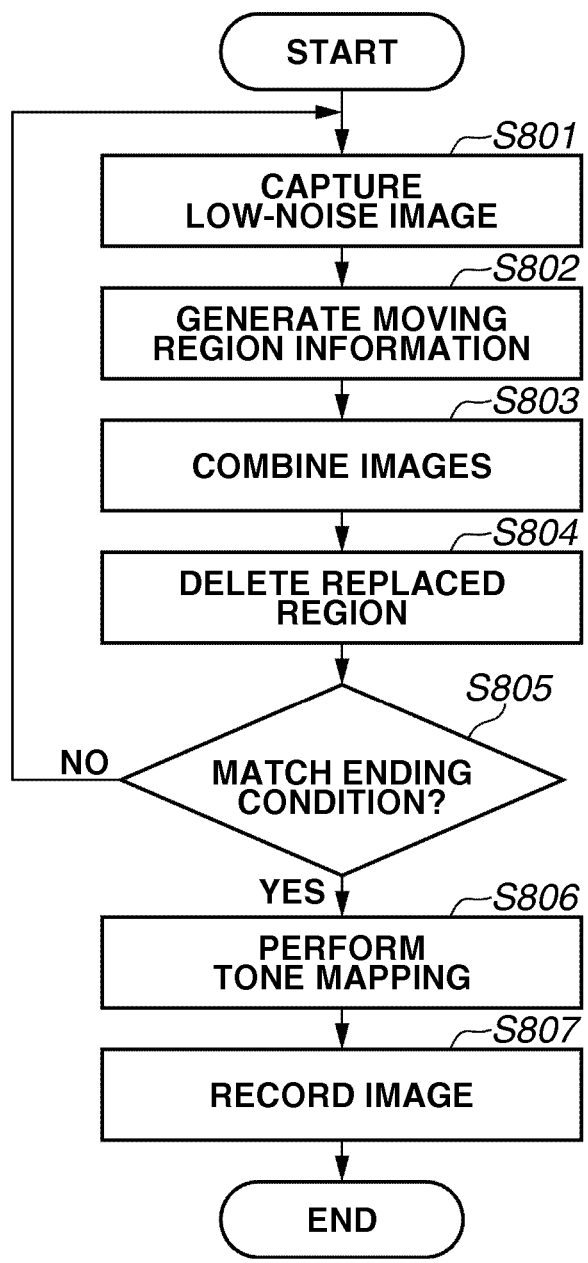

COMBINED IMAGE

LOW-NOISE IMAGE

COMBINATION STANDARD IMAGE

REPLACEMENT REGION INFORMATION
a903 REPLACEMENT

MOVING REGION INFORMATION
a902 DIFFERENCE ABSOLUTE VALUE LARGE
a904
a901 DIFFERENCE ABSOLUTE VALUE LARGE
DIFFERENCE ABSOLUTE VALUE SMALL

IMAGE PROCESSING APPARATUS AND IMAGE PROCESSING METHOD

BACKGROUND OF THE INVENTION

1. Field of the Invention

The present invention relates to a technology for expanding dynamic range by combining images.

2. Description of the Related Art

Recently, a large number of imaging apparatuses, such as digital cameras, capable of recording a combined image by combining a plurality of images have been developed as products. Some of these imaging apparatuses have a function for ameliorating overexposure or dark portion noise by combining an image captured at a higher exposure with an image captured at a lower exposure than the exposure at which the brightness of an object is appropriate. This function is called a high dynamic range (HDR) function. Generally, the dynamic range of an image sensor is narrower than the dynamic range in the natural world. For example, when capturing a backlit scene, overexposure can occur.

When capturing an image at a lower exposure, since the overall image is dark, although overexposure can be suppressed, the impression of dark portion noise deteriorates. In contrast, when capturing an image at a higher exposure, since the overall image is bright, although the overexposure occurs, the impression of dark portion noise is ameliorated. With the high dynamic function, the overexposure and the impression of dark portion noise can be ameliorated by combining a plurality of images having low exposures and high exposures, with weighting given to the underexposed images for bright regions (overexposure etc.), and conversely, weighting given to overexposed images for dark regions.

When the object moves while capturing the plurality of images, the object can turn into a double image due to combining processing. Consequently, a technology has been discussed for suppressing double images in regions in which object movement has been detected by prohibiting combining processing. Generally, a region in which object movement was detected outputs a low exposure image. This is because for images captured at a high exposure, a moving object can exhibit overexposure.

Japanese Patent Application Laid-Open No. 2002-190983 discusses a technology that, for a region in which object movement was detected, outputs an underexposed image and weakens the strength of contour enhancement to suppress the object from turning into a double image and suppress amplification of the impression of noise in the underexposed image.

As described above, when combining a plurality of images, double images can be suppressed by prohibiting the combining processing for regions in which movement was detected and outputting the underexposed image as is. However, there is the problem that for a region in which movement was detected, when an underexposed image is output, the impression of noise in the region in which movement was detected deteriorates.

Although further deterioration in the impression of noise due to noise amplification in a region in which object movement was detected can be prevented by outputting an underexposed image and weakening the strength of contour enhancement like in Japanese Patent Application Laid-Open No. 2002-190983, it is difficult to ameliorate the impression of noise in the underexposed image that was originally there.

SUMMARY OF THE INVENTION

The present invention is directed to, when combining a plurality of images, improving image quality by reducing noise in a region in which movement was detected.

According to an aspect of the present invention, an image processing apparatus capable of generating a combined image by combining a plurality of images, includes an acquisition unit configured to acquire a plurality of images including a first image having a first exposure, a second image having a second exposure that is higher than the first exposure, and at least one low-noise image having a lower noise than the first image, a moving region detection unit configured to detect moving regions in which a difference between the first image and the second image is greater than a predetermined value, a brightness detection unit configured to detect a brightness of the moving regions, a replacement region setting unit configured to set a replacement region from among the moving regions based on the brightness detected by the brightness detection unit, and a combining unit configured to combine the plurality of images, wherein the combining unit is configured to generate a combined image by combining the first image and the second image, and replace the replacement region in the combined image with an image of a region corresponding to the low-noise image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration example according to a first exemplary embodiment.

FIG. 2 illustrates a configuration example of a moving region information generation unit.

FIG. 4 illustrates a configuration example of a replacement region information generation unit.

FIG. 8 illustrates an operation flow for replacing with a low-noise image.

DESCRIPTION OF THE EMBODIMENTS

Figure 3A:
FIGS. 3A, 3B, and 3C illustrate moving region information.

Various exemplary embodiments, features, and aspects of the invention will be described in detail below with reference to the drawings.

FIG. 1 is a block diagram illustrating a configuration example when an image processing apparatus according to the present exemplary embodiment is applied in an imaging apparatus. The configuration example according to the present exemplary embodiment will now be described with reference to FIG. 1.

The imaging apparatus according to the present exemplary embodiment is configured from a lens 101, an imaging unit 102, an analog/digital (A/D) conversion unit 103, a camera signal processing unit 104, a system control unit 105 (an underexposure calculation unit and an overexposure calculation unit), and a moving region information generation unit 106 (a moving region detection unit). In addition, the imaging apparatus has a replacement region information generation unit 107 (a replacement region setting unit), an image combining unit 108 (a combination standard image generation unit), a memory 109, a tone mapping unit 110, an image recording unit 111, and an image display unit 112. Next, operation of the imaging apparatus according to the present exemplary embodiment will be described.

First, the lens 101 guides object light to the imaging unit 102. The imaging unit 102 captures an image of the object using an image sensor such as a charged-couple device (CCD) or a complementary metal-oxide-semiconductor (CMOS). The obtained object light is converted into an electric signal and output to the A/D conversion unit 103. The A/D conversion unit 103 amplifies the analog signal based on a predetermined gain, and converts the amplified analog signal into a digital signal.

The camera signal processing unit 104 performs image processing, such as white balance and contour enhancement, on the digital signal output from the A/D conversion unit 103, and outputs the resultant image data. In the present exemplary embodiment, since below-described combined image data having a wide dynamic range is generated based on post-development-processing luminance (Y) and color difference (UV) signals, the image processing, such as white balance and contour enhancement, is performed by the camera signal processing unit 104.

However, the method for generating the combined image data is not limited to this. Specifically, a pre-development-processing RAW image format may be employed at the stage when the data is input into the image combining unit 108. In this case, the camera signal processing unit 104 only performs pre-development processing such as pixel interpolation processing.

The system control unit 105 transmits instructions to the respective blocks in the camera, controls each block, and performs arithmetic processing. For example, the system control unit 105 controls exposure based on shutter speed and aperture according to the brightness of the image data output from the camera signal processing unit 104. In the present exemplary embodiment, the imaging apparatus has a HDR imaging mode that generates image data having a wider dynamic range than single image data by combining image data obtained by imaging an object a plurality of times at different exposures based on control by the system control unit 105.

The moving region information generation unit 106 detects a moving region and outputs moving region information by evaluating the absolute value of a pixel difference between image data output from the camera signal processing unit 104 and image data delayed by the memory 109.

The replacement region information generation unit 107 determines a region to be replaced with a low-noise image in a below-described combination standard image, and outputs the replacement region information. The method for generating the replacement region information will be described in detail below.

The image combining unit 108 combines image data output from the camera signal processing unit 104 and image data delayed by the memory 109. During this process, the image combining unit 108 determines a combining ratio based on the brightness of the image data output from the camera signal processing unit 104 and the moving region information generated by the moving region information generation unit 106, combines the image data, and outputs the combined image data as a combination standard image to the memory 109. Further, the image combining unit 108 combines the image data output from the camera signal processing unit 104 and the combination standard image delayed by the memory 109 based on replacement region information generated by the replacement region information generation unit 107 and moving region information generated by the moving region information generation unit 106. The combined image data is output to the below-described tone mapping unit 110.

The memory 109 is a memory for recording images, such as the combination standard image, output from the image combining unit 108.

The tone mapping unit 110 performs tonal compression of the combined image data based on, for example, a respective characteristic curve for display and recording, by nonlinear processing such as gamma processing.

The image recording unit 111 compresses and codes the image that was tone-mapped by the tone mapping unit 110 based on a predetermined compression and coding method, and records the generated data in a recording medium. The image display unit 112 is configured from, for example, a liquid crystal panel. The image display unit 112 resizes the image that was tone-mapped by the tone mapping unit 110 to an image size for display, and displays the resized image.

Next, operation of the moving region information generation unit 106, the replacement region information generation unit 107, and the image combining unit 108 will be described in more detail.

(Moving Region Information Generation Unit 106)

The moving region information generation unit 106 detects a moving region and outputs moving region information by evaluating the absolute value of a pixel difference between image data output from the camera signal processing unit 104 and image data delayed by the memory 109. Below, first an example of capturing an underexposed image will be described, and then an example of capturing an overexposed image will be described. The underexposed image is recorded in the memory 109 as is without subjecting it to image combining processing by the image combining unit 108. The imaging order is not limited to capturing an underexposed image and then an overexposed image. Instead, the overexposed image may be captured first.

FIG. 2 illustrates a configuration example of the moving region information generation unit 106.

A pixel level matching unit 201 equalizes (normalizes) the brightness of the underexposed image output from the memory 109 and the brightness of the overexposed image output from the camera signal processing unit 104. Specifically, the pixel level matching unit 201 matches the brightness of the underexposed image with the brightness of the overexposed image either by amplifying a pixel value of the underexposed image or by reducing a pixel value of the overexposed image based on an exposure difference.

A pixel difference absolute value calculation unit 202 calculates the absolute value of a pixel difference for each individual pixel between the underexposed image and the overexposed image whose pixel levels have been matched by the pixel level matching unit 201. In a moving region, an absolute value of this pixel difference increases. Conversely, in a still region, the absolute value of the pixel difference decreases.

A moving region grouping unit 203 forms groups of pixel difference absolute value among the pixel difference absolute values for the individual pixels calculated by the pixel difference absolute value calculation unit 202, determines whether there is movement in each region, and outputs the resultant moving region information.

Figure 3B:
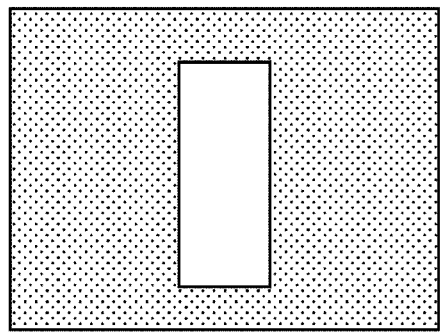
Figure 3C:
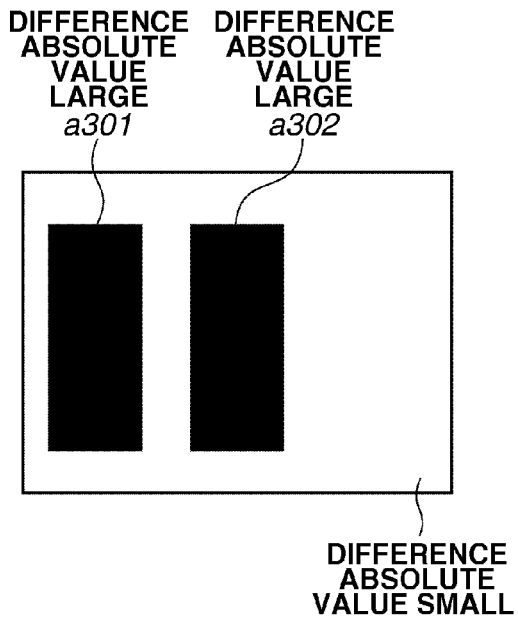

FIG. 3 schematically illustrates the processing that is performed by operation of the moving region information generation unit 106. FIG. 3A illustrates an image captured at a low exposure, FIG. 3B illustrates an image captured at a high exposure, and FIG. 3C illustrates moving region information. Further, FIGS. 3A and 3B illustrate images having pixel levels that were matched by the pixel level matching unit 201. In the moving region information illustrated in FIG. 3C, the blackened portions have been determined to be moving regions.

FIG. 3 illustrates an imaging scene in which a bright rectangular object moves from left to right across a dark background. Consequently, the rectangular object that was on the left for the underexposed image in FIG. 3A moves toward the center for the overexposed image in FIG. 3B.

The pixel difference absolute value calculation unit 202 calculates the pixel difference absolute value between the pixel value of the image obtained by normalizing the underexposed image in FIG. 3A and the pixel value of the overexposed image in FIG. 3B for each individual pixel. Since the rectangular object is moving, the pixel difference absolute value at that portion increases. Further, since the background portion, which is the portion other than the rectangular object, is not moving, the pixel difference absolute value decreases.

Moving region information illustrated in FIG. 3C is generated by the grouping of pixel difference absolute values by the moving region grouping unit 203. The moving region information in FIG. 3C is determined to be a moving region because a region a302, which is the movement destination, and a region a301, which is the movement origin of the rectangular object, have a pixel difference of a larger absolute value.

Based on the above operations, the moving region information generation unit 106 detects a moving region and outputs moving region information.

(Replacement Region Information Generation Unit 107)

Next, the replacement region information generation unit 107 will be described in more detail with reference to FIG. 4.

A moving region brightness calculation unit 401 (brightness calculation unit) calculates the brightness in the moving region detected by the moving region information generation unit 106 and in a moving region peripheral region in an image output from the memory 109. This brightness is, for example, the average luminance value of the individual pixels in each region.

A moving region picture determination unit 402 (picture evaluation unit) evaluates a picture in the moving region indicated by the moving region information and in a moving region peripheral region in an image output from the memory 109. Specifically, for example, the moving region picture determination unit 402 calculates the variance of the luminance values of the moving region or the moving region peripheral region. If the variance is large, the moving region picture determination unit 402 determines that the picture is complex (has texture). If the variance is smaller than a predetermined value, the moving region picture determination unit 402 determines that the picture is smooth.

A replacement region determination unit 403 determines a region to be replaced with a low-noise image in the combination standard image, based on the brightness in the moving region and the moving region peripheral region calculated by the moving region brightness calculation unit 401, and pictures in the moving region and the moving region peripheral region determined by the moving region picture determination unit 402. The determined replacement region in the combined image is output as replacement region information. The method for determining the replacement region will be described in detail below.

(Image Combining Unit 108)

Next, the image combining unit 108 will be described in more detail with reference to FIG. 5.

Figure 5:
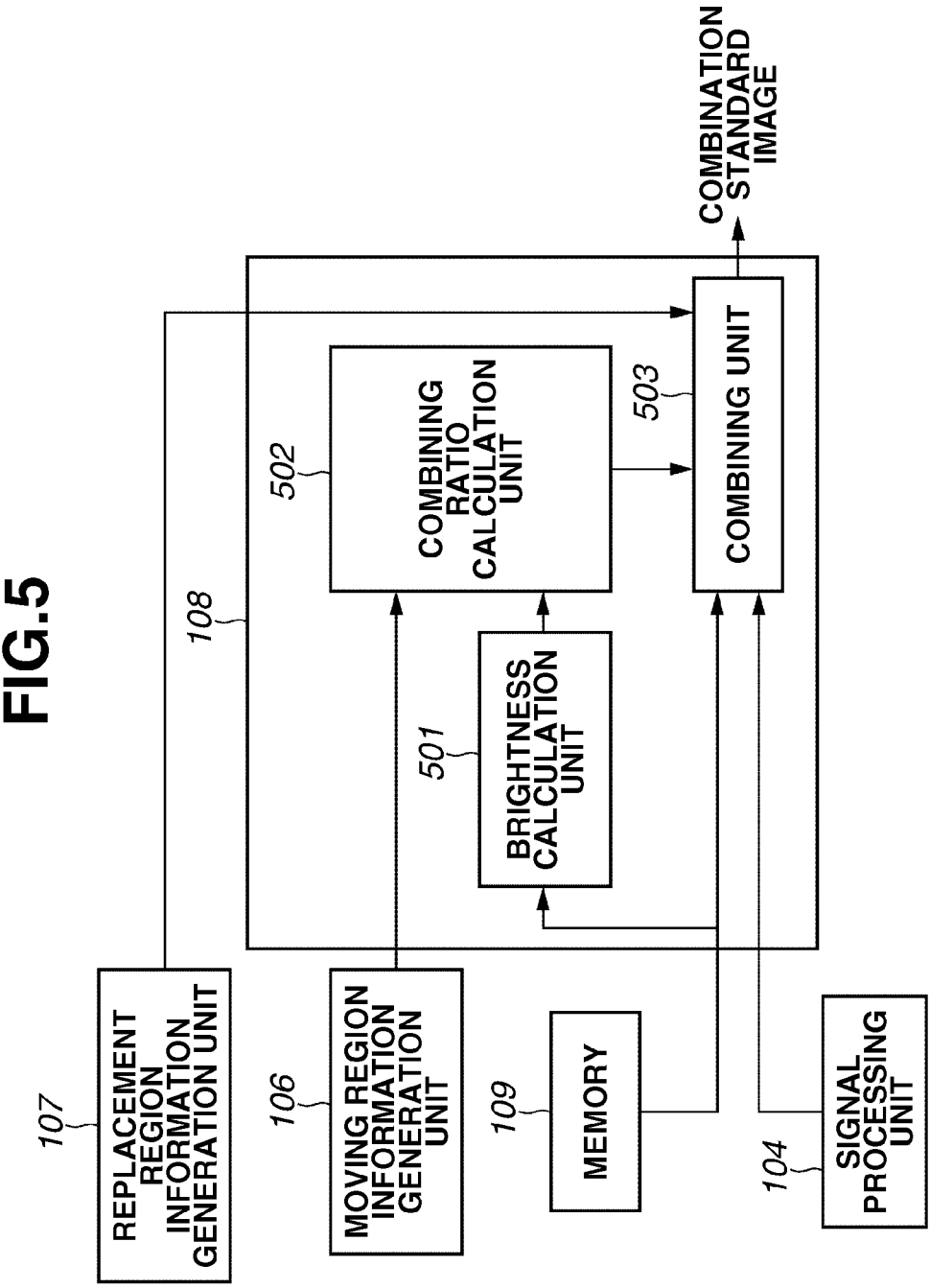
FIG. 5 illustrates a configuration example of an image combining unit.

FIG. 5 illustrates a configuration example of the image combining unit 108.

A brightness calculation unit 501 calculates the brightness of an image output from the memory 109 for each pixel. This brightness is, for example, a luminance value. A combining ratio calculation unit 502 calculates a combining ratio for each region based on the brightness calculated by the brightness calculation unit 501 and the moving region information generated by the moving region information generation unit 106.

Specifically, for bright regions, the combining ratio is set higher for an underexposed image than for an overexposed image, since an overexposed image is likely to have overexposure. For dark regions, the combining ratio is set higher for an overexposed image than for an underexposed image, since an underexposed image is likely to show a loss of shadow detail. Further, in a moving region, if a plurality of images is combined, the moving object can turn into a double image in the combined image. Consequently, the combining ratio of an underexposed image is set higher for a moving region than for a non-moving region.

The reason for setting the combining ratio of an underexposed image higher than for an overexposed image is because a moving object in an overexposed image may suffer from overexposure. A combining unit 503 combines for each region the image data output from the camera signal processing unit 104 and the image data output from the memory 109 based on the combining ratio calculated by the combining ratio calculation unit 502. However, when replacement region information is output from the replacement region information generation unit 107, the combining unit 503 only performs combining processing on the replacement region as the combination target region. Regions other than the replacement region are output as is without combining with the image output from the memory 109. Such a combined image in which a replacement region remains is referred to here as a "combination standard image".

Figure 6:
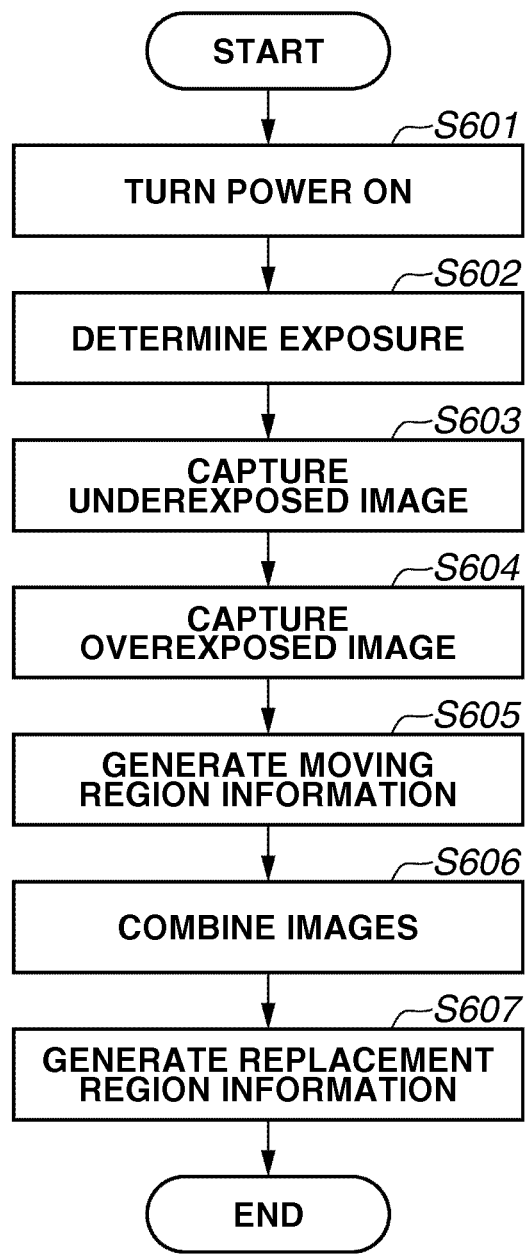
FIG. 6 illustrates an operation flow for generating replacement region information.

Next, an operation flow in which the replacement region information generation unit 107 generates replacement region information will be described with reference to FIGS. 6 and 7. The operations in FIGS. 6 and 7 are performed by the respective blocks based on instructions from the system control unit 105.

Processing starts from step S601 when the system control unit 105 detects that the imaging apparatus has entered an HDR imaging mode for generating an image having a wider dynamic range than apiece of captured image data. In step S601, the imaging apparatus is in a standby state waiting for a half press operation of a release switch that instructs the start and holding of exposure control, focus control and the like. When the release switch is half pressed, in step S602, the system control unit 105 determines the imaging conditions, including the determination of a plurality of different exposure values (a first exposure, a second exposure, and a low-noise image exposure) to be used for the proper imaging.

In step S603, the imaging unit 102 captures an underexposed image (a first image) at a low exposure value. This underexposed image is subjected to signal processing by the camera signal processing unit 104, and is then temporarily recorded in the memory 109. In step S604, the imaging unit 102 captures overexposed images (a second image and a low-noise image) at a higher exposure value than the exposure of the low exposure value. In step S605, the moving region information generation unit 106 inputs an overexposed image output from the camera signal processing unit 104 and the underexposed image output from the memory 109, and as described above, generates moving region information based on the pixel difference absolute values.

In step S606, the image combining unit 108 combines an overexposed image output from the camera signal processing unit 104 and the underexposed image output from the memory 109 based on the moving region information and image brightness, outputs a combination standard image, and records the output combination standard image in the memory 109. In step S607, the replacement region information generation unit 107 determines the region to be replaced with the low-noise image, and outputs the generated replacement region information.

The method for determining the replacement region will now be described in detail with reference to FIG. 7. Similar to FIG. 3, FIG. 7 illustrates an imaging scene in which a bright rectangular object moves from left to right across a dark background. Since FIGS. 7A, 7B, and 7D are the same as FIGS. 3A, 3B, and 3D, a description thereof will be omitted here.

Figure 7A:
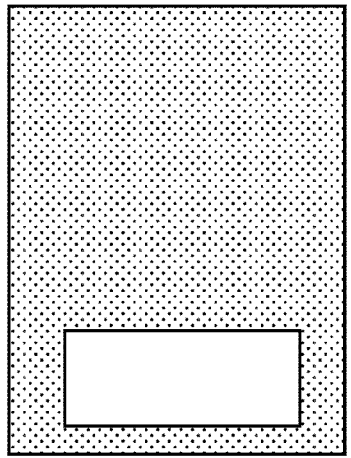
FIGS. 7A to 7F illustrate replacement region information.
Figure 7B:
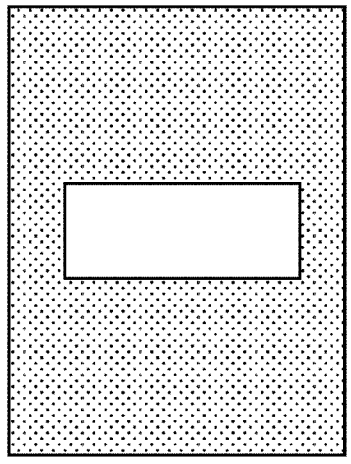
Figure 7C:
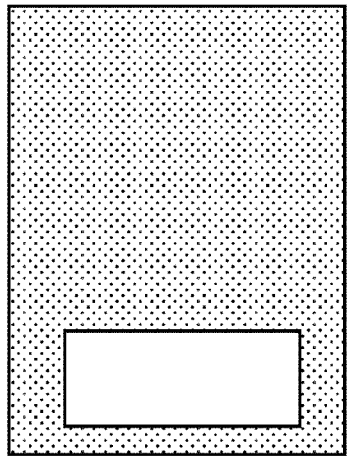

FIG. 7C illustrates a combination standard image in which the underexposed image of FIG. 7A and the overexposed image of FIG. 7B have been combined by the image combining unit 108. The combination standard image in FIG. 7C has been combined such that, regarding the regions determined as being a moving region based on the moving region information in FIG. 7D (region a301 and region a302), the underexposed image of FIG. 7A has a higher combining ratio. On the other hand, regarding the regions that were not determined as being a moving region based on the moving region information in FIG. 7D (regions other than region a301 and region a302), the combining ratio of the overexposed image is set higher since the background region is dark in both the underexposed image of FIG. 7A and the overexposed image of FIG. 7B.

The thus-combined combination standard image of FIG. 7C mixes regions having a high combining ratio of an overexposed image and regions having a high combining ratio of an underexposed image. Since an underexposed image has a worse signal-to-noise ratio (S/N) than an overexposed image, in the combination standard image of FIG. 7C, a difference in the impression of noise tends to be especially noticeable between regions a301 and a302 and their peripheral regions.

Figure 7D:
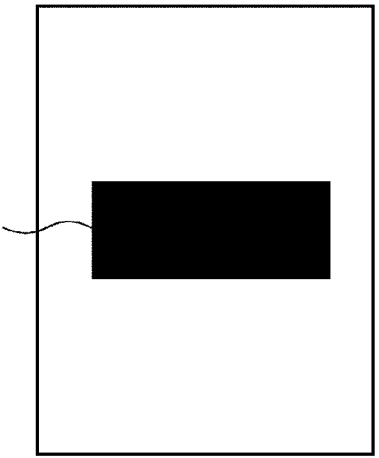
Figure 7E:
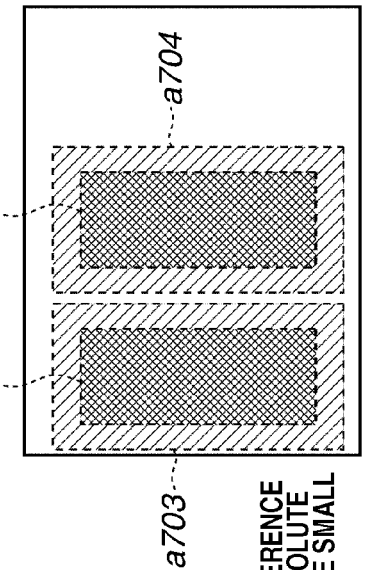

The moving region brightness calculation unit 401 and the moving region picture determination unit 402 perform brightness calculation and picture evaluation of the moving regions (region a701 and region a702) and the moving region peripheral regions (region a703 and region a704) indicated by the moving region information of FIG. 7D in the replacement determination region in FIG. 7E.

The replacement region determination unit 403 sets a moving region having a moving region brightness equal to or less than a predetermined value, and a difference between the brightness of the moving region and the moving region peripheral region equal to or less than a predetermined value, as a replacement region.

Alternatively, the replacement region determination unit 403 sets a moving region having a moving region brightness equal to or less than a predetermined value, and where a picture of the moving region and the moving region peripheral region is determined to be smooth, as a replacement region.

Figure 7F:
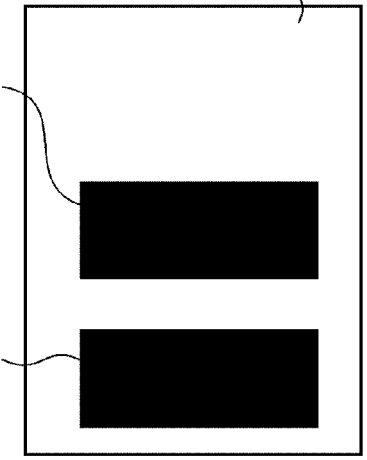

This is because poor S/N tends to be visually more noticeable in dark regions than in bright regions. Further, poor S/N tends to be visually more noticeable in smooth picture regions than in complex picture regions. In the example illustrated in FIG. 7, when the brightness of the combination standard image of the moving regions a701 and a702 is compared with a predetermined value (threshold), the brightness of the region a702 is less (the region is darker) than the predetermined value. In addition, the brightness difference in the combination standard image of the moving region a702 and the moving region peripheral region a704 is smaller than the predetermined value. In such a case, as illustrated in FIG. 7F, the region a705 (region that was a702) is determined to be a replacement region.

Similarly, in FIG. 7, the combination standard image picture in the moving region a702 and the moving region peripheral region a704 are both smooth, and the moving region a701 and the moving region peripheral region a703 exceed the standard value (are not smooth). In this case too, as illustrated in FIG. 7F, the region a705 is determined to be a replacement region.

When emphasis is placed on a image quality, all moving regions can be determined to be replacement regions without narrowing down the moving regions to determine replacement regions from among all the moving regions indicated by the moving region information. However, the more replacement regions there are, the greater the number of times image capturing has to be performed to acquire a low-noise image of the replacement region. Therefore, when emphasis is placed on a reduction in the overall imaging processing time, it is desirable to narrow down the replacement regions based on the two determination methods described above.

Based on such an operation flow, the replacement region information generation unit 107 generates replacement region information.

Next, an operation flow in which the image combining unit 108 replaces the combination standard image with a low-noise image based on replacement region information will be described with reference to FIGS. 8 and 9.

In step S801, the imaging unit 102 captures a low-noise image. This low-noise image is an image that at least has less noise or higher signal-to-noise ratio than the underexposed image captured to generate the combination standard image. Examples include an image captured at a higher exposure than the underexposed image generated by changing an exposure time or F number and an image captured at a lower amplification rate than the amplification rate (ISO sensitivity) of the A/D conversion unit 103 when the underexposed image is captured.

In step S802, the moving region information generation unit 106 inputs the low-noise image output from the camera signal processing unit 104 and the combination standard image output from the memory 109, and generates moving region information. In step S803, the image combining unit 108 combines the combination standard image and the low-noise image based on the moving region information and the replacement region information.

The combining method performed by the image combining unit 108 will be described with reference to FIG. 9.

FIG. 9 is a continuation of the imaging scenes of FIGS. 3 and 7, in which a bright rectangular object moves from left to right across a dark background. FIGS. 9A and 9E illustrate the same combination standard image and replacement region information as FIGS. 7C and 7F. FIG. 9B illustrates a low-noise image. FIG. 9C illustrates a combination image that combines the combination standard image and the low-noise image. Further, FIG. 9D illustrates moving region information generated by the moving region information generation unit 106 in step S802, in which region a901 and region a902 having a pixel difference of a large absolute value between the combination standard image of FIG. 9A and the low-noise image of FIG. 9B are determined to be moving regions.

Figure 9C:
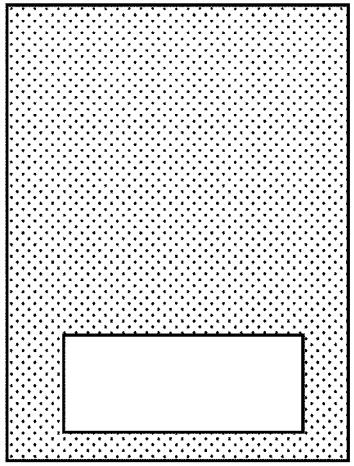
FIGS. 9A to 9E illustrate replacement processing.
Figure 9B:
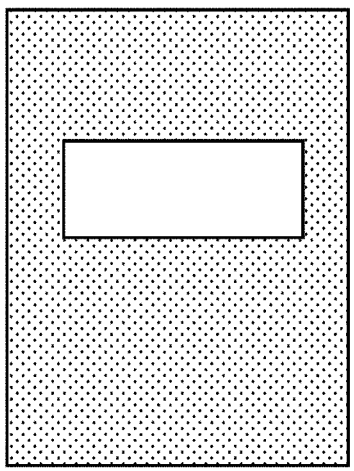
Figure 9A:
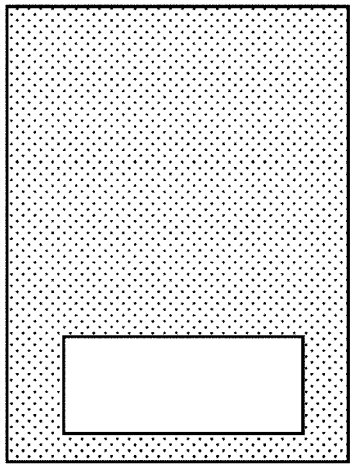
Figure 9E:
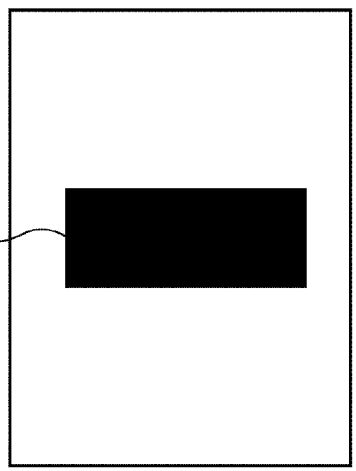
Figure 9D:
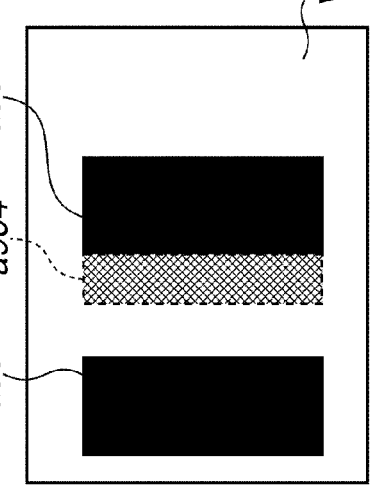

The image combining unit 108 sets the replacement region a903 indicated by the replacement region information in FIG. 9E generated by the replacement region information generation unit 107 as a combination target region, and the combination standard image of FIG. 9A is output as is without performing combining processing on the regions other than the replacement region a903. As indicated by the moving region information of FIG. 9D, the replacement region a903 indicated by the replacement region information of FIG. 9E includes a part of the moving region a902 and the region a904, which is not a moving region.

Of the replacement region a903, the image combining unit 108 combines the region a904, which is not a moving region, with the low-noise image set at a high combining ratio, and the moving region is output with the combination standard image of FIG. 9A as is. Specifically, since a combined image is output in which, in the combination standard image, a region corresponding to the replacement region and a region that is not a moving region are replaced with a low-noise image, the combined image has a better S/N than the combination standard image has.

In calculating the brightness with the brightness calculation unit 501, when the low-noise image replacement region and the region that is not a moving region is overexposed or underexposed, the combination standard image does not have to be replaced with the low-noise image.

Returning to FIG. 8, in step S804, the replacement region information is updated by removing the region replaced with the low-noise image in step S803 from the replacement region information.

A combined image having an improved combination standard image S/N can be generated by repeating steps S801 to S804. This repeated processing finishes when it is determined in step S805 that any of the following ending conditions has been met.

Replacement of all replacement regions is completed.
A predetermined time has elapsed since the start of replacement processing.
Instruction is issued to stop replacement processing from the user.

During the period from starting the imaging to finishing the replacement processing, the image does not have to be displayed on the image display unit 112. This is because by not displaying the image, the user realizes that imaging is not completed, so that the user continues imaging while still holding the imaging apparatus.

In step S806, the tone mapping unit 110 performs tone mapping on the combined image. In step S807, the tone-mapped combined image is recorded in the image recording unit 111.

In the present exemplary embodiment, although an example was described in which a low-noise image is captured after generating a combination standard image, the low-noise image can be captured before generating the combination standard image. In such a case, the low-noise image is recorded in the memory 109, and is used by the image combining unit 108 for image combination.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-152959 filed Jul. 11, 2011, which is hereby incorporated by reference herein in its entirety.

What is claimed is:

1. An image processing apparatus capable of generating a combined image by combining a plurality of images, the apparatus comprising:
an acquisition unit configured to acquire a plurality of images including a first image having a first exposure, a second image having a second exposure that is higher than the first exposure, and at least one low-noise image having a higher signal-to-noise ratio than the first image;
a moving region detection unit configured to detect moving regions in which a difference between the first image and the second image is greater than a predetermined value;
a brightness calculation unit configured to calculate a brightness of the moving regions;
a replacement region setting unit configured to set replacement regions from among the moving regions based on the brightness detected by the brightness detection unit; and
a combining unit configured to combine the plurality of images,
wherein the combining unit is configured to generate a combined image by combining the first image and the second image, and replace the replacement regions in the combined image with an image of a region corresponding to the low-noise image.

2. The image processing apparatus according to claim 1, wherein the replacement region setting unit is configured to set a moving region having a moving region brightness calculated by the brightness calculation unit equal to or less than a predetermined value, as a replacement region.

3. The image processing apparatus according to claim 2, wherein the brightness calculation unit is configured to calculate the brightness of a peripheral region of a moving region detected by the moving region detection unit, and
wherein the replacement region setting unit is configured to set the moving region having a difference between the moving region brightness and the moving region periphery brightness calculated by the brightness calculation unit that is equal to or less than a predetermined value, as the replacement region.

4. The image processing apparatus according to claim 1, further comprising a picture evaluation unit configured to evaluate smoothness of a picture in a moving region among the moving regions and a picture in the moving region periphery,
wherein the replacement region setting unit is configured to set the moving region in which a picture in the moving region is smoother than a predetermined standard, and a picture in the moving region periphery is smoother than the predetermined standard, as a replacement region.

5. The image processing apparatus according to claim 1, wherein the moving region detection unit is configured to detect a moving region having a difference between the low-noise image and the first image that is larger than a predetermined value, and the replacement region setting unit is configured to replace the replacement regions with the low-noise image when there are no such moving regions in the replacement regions.

6. The image processing apparatus according to claim 1, wherein the replacement region setting unit is configured to replace the replacement regions with the low-noise image when the low-noise image in the replacement regions is not overexposed or underexposed.

7. The image processing apparatus according to claim 1, wherein the replacement region setting unit is configured to, among the replacement regions, remove the region replaced with the low-noise image by the combining unit, from the replacement regions.

8. The image processing apparatus according to claim 1, wherein the replacement region setting unit is configured to finish replacement when all of the replacement regions have been replaced with the low-noise image.

9. The image processing apparatus according to claim 1, wherein the replacement region setting unit is configured to finish replacement after a predetermined time has elapsed from start of replacement by the combining unit.

10. The image processing apparatus according to claim 1, further comprising a display unit configured to display an image combined by the combining unit, wherein the display unit is configured to not display the combined image until the replacement by the combining unit has finished.

11. The image processing apparatus according to claim 1, wherein the low-noise image is an image captured at a higher exposure than the first exposure.

12. The image processing apparatus according to claim 1, wherein the low-noise image is an image captured at a smaller amplification rate than the first image.

13. The image processing apparatus according to claim 4, wherein the picture evaluation unit is configured to calculate variance of the moving regions, and determine that the moving regions are smoother than the predetermined standard if the variance is equal to or less than a predetermined value.

14. The image processing apparatus according to claim 1, wherein the brightness calculation unit is configured to calculate an average luminance of moving region images, and set the calculated average luminance as the moving region brightness.

15. The image processing apparatus according to claim 1, wherein the combining unit is configured to combine the first image and the second image at a combining ratio based on luminance of each region in the first image.

16. An image processing method for generating a combined image by combining a plurality of images, the method comprising:

first imaging of a first image having a first exposure;

second imaging of a second image having a second exposure that is higher than the first exposure;

third imaging of at least one low-noise image having a higher signal-to-noise ratio than the first image;

detecting a moving regions in which a difference between the first image and the second image is greater than a predetermined value;

detecting brightness of the moving regions;

setting a replacement region from among the moving regions based on the detected brightness;

combining the first image and the second image to generate a combined image; and replacing the replacement region in the combined image with an image of a region corresponding to the low-noise image.

17. A non-transitory computer-readable storage medium storing a program for causing a computer to execute each operation of the image processing method according to claim 16.

* * * * *